No. 896,877. PATENTED AUG. 25, 1908.
F. W. WITTE.
BALL JOURNAL AND THRUST BEARING.
APPLICATION FILED MAY 6, 1907.
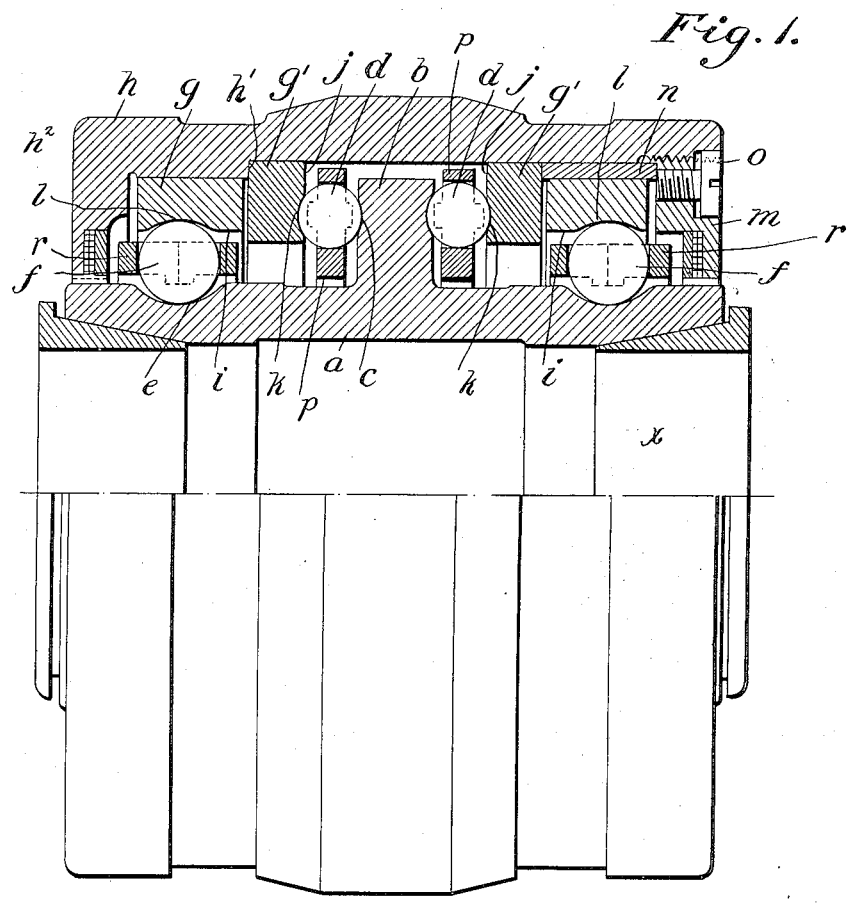
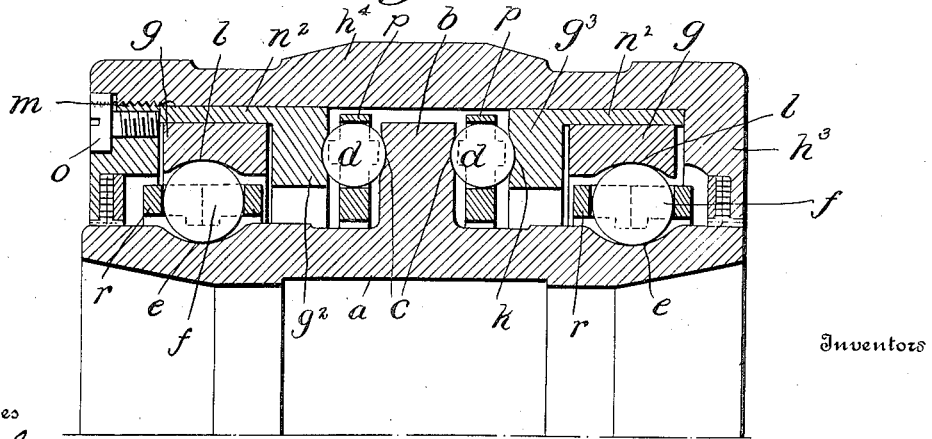

UNITED STATES PATENT OFFICE.

FRIEDRICH WILHELM WITTE, OF LEIPZIG-PLAGWITZ, GERMANY.

BALL JOURNAL AND THRUST BEARING.

No. 896,877.    Specification of Letters Patent.    Patented Aug. 25, 1908.

Application filed May 6, 1907. Serial No. 372,093.

*To all whom it may concern:*

Be it known that I, FRIEDRICH WILHELM WITTE, a citizen of the United States of America, and a resident of Leipzig-Plagwitz, Naumburgerstrasse 25, Germany, have invented a certain new and useful Improvement in Ball Journal and Thrust Bearings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to ball journal bearings of the two point type of the class which are provided also with means for taking up end thrust by a central fixed flange on the shaft sleeve and loose rings on which both the journal and thrust balls bear, such as that described for instance in the specification to my British Letters Patent No. 11808 of 1903.

The object of the present invention is to enable the journal balls in that form to run in grooved tracks both in the "cup" and "cone" portions carrying same. In my previous specification one of these tracks was a plain cylindrical surface but as is well known the form of bearing which gives the best results is that in which both tracks are grooved, but in the class of combined bearings in question this construction gives rise to difficulties in the adjustment of the parts which renders it impracticable. This difficulty lies in the impossibility in manufacture of maintaining the required distance apart between the centers of the grooves forming the tracks for the journal balls and the bottom of the grooves for the thrust balls owing to the variations which must occur in tempering and grinding, a very slight variation necessitating an adjustment of the loose part carrying a journal and a thrust track in the direction which will cause the grooved track for the journal balls to be non-central with the latter. I overcome this difficulty by separating the thrust part of the loose ring from the journal part of same, which is thus left free, and I further provide means for adjusting or allowing of the adjustment of one of the parts independently of the other.

It is not new to have in a single casing both a thrust and a journal bearing both of which are provided fully with grooved tracks for the balls and in one form this has been proposed with the addition of a flange mounted on a sleeve on the shaft which sleeve abuts against the "cone" portion of the journal bearing. Thus in this form a composite "cone" portion may be said to be formed having grooved tracks at right angles for the journal and thrust balls and with this an adjustment for the thrust balls has been provided, the special object of which was to move the shaft longitudinally through the composite cone.

In order that the said invention may be clearly understood it will now be described with reference to the accompanying drawings in which:

Figure 1 is a longitudinal section of one half of a journal and thrust bearing constructed in accordance with the present invention and Fig. 2 is a similar view of a somewhat modified form.

In said drawings as in my aforesaid prior specification, $a$ indicates the sleeve or bushing forming the "cone" of the journal secured to the axle or shaft $x$; $b$ is the thrust-resisting flange thereon, having on its opposite sides grooved tracks $c$ $c$ of suitable curvature for the thrust bearing balls $d$ $d$ arranged in ball cages $p$; $e$ $e$ are the tracks on the sleeve portion $a$ for the balls $f f$ of the journal bearing which are arranged in ball cages $r$, $g$ $g$ are bushings or "cups" upon which the balls $f$ bear; and $h$ is a casing inclosing all of the above named parts. $i$ $i$ are the inner faces of the bushings or cups $g$, said faces being, according to the present invention, provided with grooved tracks $l$ $l$ of suitable curvature constituting races for the balls $f$; $j$ $j$ are the thrust bearing faces carried by parts $g'$ $g'$ separate from the journal bearing and $k$ $k$ are the ball grooves therein.

Like letters of reference indicate like parts in the several views.

As shown in the said drawings, the journal and thrust bearings are separated from each other, $g$ $g$ being the rings which serve as journal bearing members, and $g^1$ $g^1$ the parts which serve as thrust bearing members. The space between the parts $g$ and $g^1$ is adjustable by means of a device which in this case consists of a sleeve $n$, surrounding one of the journal rings or cups $g$ and is introduced therewith into the casing $h$ after the other parts have been put in place. The adjusting device however instead of being a sleeve may be an equivalent device adapted to move the thrust bearing ring.

The sleeve $n$, shown, is of greater width than the journal ring $g$ and consequently projects beyond the edges of same at both ends thereof. At its outer end face, the sleeve $n$ abuts against a lock nut $m$, said lock nut thus constituting an adjusting ring which presses the sleeve against the adjacent thrust bearing ring $g^1$ and thence transmits the pressure through the balls $d$ $d$ and flange $b$ to the other thrust bearing ring $g^1$ which may be thus pressed against a shoulder $h^1$ of the casing for the purpose of limiting the movement of the last named thrust bearing ring $g^1$ towards the adjacent journal ring $g$. To prevent the adjusting ring $m$ from being accidentally turned, there may be provided a screw $o$, which can also if desired be manipulated after the adjusting ring $m$ has been screwed into place, so as to correct if necessary the adjustments of the thrust bearing rings.

It will be seen that with the above mode of construction, the necessary distance between the grooved tracks $k$ and $l$ is attained by the movement of the rings $g$ and $g^1$ relatively to tracks $e$ and $c$. If $g$ and $g^1$ were fixed it would be almost impossible to so set them that the ball grooves would exactly correspond with the fixed tracks $e$ and $c$ and if the grooves did not exactly correspond with the tracks it would be impossible to prevent side or thrust pressure other than that for which the parts were designed.

The example shown in Fig. 2 is similar to the one shown in Fig. 1, except that the sleeve $n^2$ is integral with the adjacent thrust bearing ring $g^2$, and that, in place of the shoulder $h^1$ shown in Fig. 1, the other ring $g^3$ is provided with a sleeve or prolongation $n^2$ which surrounds the corresponding journal ring $g$ and bears against the inwardly extending end flange $h^3$ of the casing $h^4$ so as to take up the end thrust of the ring $m$. Other variations of the arrangement may however be employed.

It will be obvious that in place of the end flange $h^2$ of the casing, a second screwed adjusting ring and loose sleeve similar to those shown at $m$ $n$ in Fig. 1 may be employed. In such a case, the shoulder $h^1$ might also be dispensed with.

The balls $f$ may be put between their grooved tracks by any suitable means which will enable the operation to be done and preferably by such as will not interfere with the running surface of the tracks. Many of these devices exist. For instance grooves or cuts may be made in one or both of the parts $g$ or $a$ partly entering the tracks and the balls be filled in by these means or a portion of one or both of the parts $g$ or $a$ communicating with the track may be cut away for the same purpose or the balls may be filled in between the ring $g$ and part $a$ by the well known way of merely placing the two parts eccentrically and filling in as many balls between them as can be put in, the balls being afterwards spaced apart by a cage or spacing device. The means employed for this purpose however need not be here further described.

It is obvious that if only one journal bearing is required, or the thrust to be taken is only in one direction, that one row of journal balls, or one row of thrust balls, or both together, with their attendant parts can be dispensed with.

What I claim is:—

1. A ball journal and thrust bearing comprising a member having grooves therein, a journal ring having a groove forming a race with one of the grooves of said member, journal balls in said race, a thrust ring separate from said journal ring and forming a race with another of the grooves of said member, thrust balls in said race, and means for adjusting said thrust ring independently of the journal ring, said means comprising a member surrounding the journal ring and adapted to bear against the thrust ring, and means for shifting said last-named member.

2. A ball journal and thrust bearing comprising a shaft, a sleeve on said shaft having a pair of grooves and having a central flange provided with grooves on opposite sides thereof, a pair of journal rings each provided with a groove forming a race with one of the grooves of said sleeve, journal balls in said races, and a pair of thrust rings separate from said journal rings and each provided with a groove forming a race with one of the grooves of said flange, and thrust balls in said races.

3. A ball journal and thrust bearing comprising a shaft, a sleeve on said shaft, having a pair of grooves and having a central flange provided with grooves on opposite sides thereof, a pair of journal rings each provided with a groove forming a race with one of the grooves of said sleeve, journal balls in said races, a pair of thrust rings separate from said journal rings and each provided with a groove forming a race with one of the grooves of said flange, thrust balls in said races, and means for adjusting said thrust rings independently of the journal rings.

4. A ball journal and thrust bearing comprising a shaft, a sleeve on said shaft having a pair of grooves and having a central flange provided with grooves on opposite sides thereof, a pair of journal rings each provided with a groove forming a race with one of the grooves of said sleeve, journal balls in said races, a pair of thrust rings separate from said journal rings and each provided with a groove forming a race with one of the grooves of said flange, thrust balls in said races, and means for adjusting said thrust rings independently of the journal rings, said means comprising a sleeve surrounding one of the journal rings and adapted to bear against one of the thrust rings, and means for shifting said last-named sleeve.

The foregoing specification signed at Leipzig, Germany this 4th day of April, 1907.

FRIEDRICH WILHELM WITTE.

In presence of two witnesses—
RUDOLPH FRICKE,
SOUTHARD P. WARNER.